Figure 1:
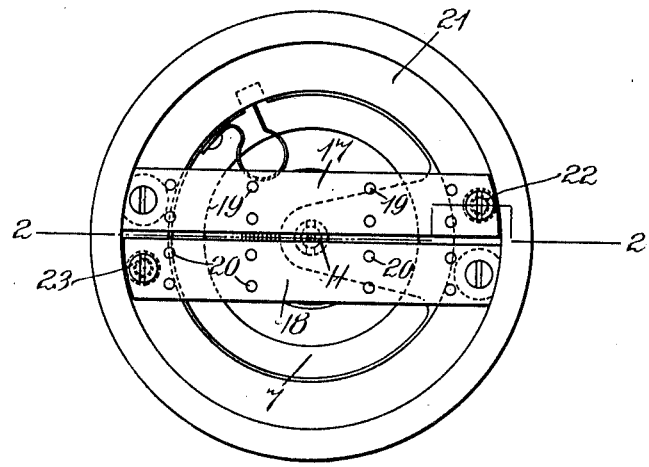

W. K. MENNS.
ELECTROMAGNETIC INSTRUMENT.
APPLICATION FILED OCT. 7, 1910.

1,035,378.

Patented Aug. 13, 1912.

Witnesses.
Franklin E. Low.
Sydney E. Taft.

Inventor:
Walter K. Menns,
by his attorney,
Charles S. Gooding.

UNITED STATES PATENT OFFICE.

WALTER K. MENNS, OF MALDEN, MASSACHUSETTS, ASSIGNOR TO CHARLES H. PEARSON, OF BROOKLINE, MASSACHUSETTS.

ELECTROMAGNETIC INSTRUMENT.

1,035,378.  Specification of Letters Patent.  Patented Aug. 13, 1912.

Application filed October 7, 1910. Serial No. 585,785.

*To all whom it may concern:*

Be it known that I, WALTER K. MENNS, a subject of King George V of England, residing at Malden, in the county of Middlesex and State of Massachusetts, have invented new and useful Improvements in Electromagnetic Instruments, of which the following is a specification.

This invention relates to improvement in indicating devices such as electricity meters, tachometers and electromagnetic speed indicators, and particularly to electro-magnetic indicating devices of that class in which the indicating element is moved by a disk of low electrical resistance placed within the field of a magnetic rotor which, when rotated, sets up lines of magnetic force flowing through the disk producing a braking effect which tends to rotate the disk with the rotor, there being provided a spring restraining the disk and acting to return it to its initial or zero position when the magnetic rotor ceases to rotate. The variable rotation of the magnetic rotor due to the variable speed of the machine to which it is connected to be driven acts to move the indicating element to varying positions corresponding to the speed of the machine, there being provided a suitable graduated scale by means of which the speed may be read. Such instruments have been found to be very seriously affected in their accuracy by variations in temperature as, for example, in the case of magnetic speedometers for automobiles which are usually calibrated at a temperature of about 68 or 70° F., actual tests have shown an inaccuracy in reading amounting to 16⅔% over-registration at 16.3° F. and amounting to 15% under-registration at 137.5° F., the variation per degree change of temperature being .27%. This means a discrepancy of about ten miles per hour between summer and winter readings when actually traveling at sixty miles per hour, and a discrepancy of about five miles per hour when actually traveling at thirty miles per hour. Since the reading of the instrument is proportional to the currents induced in the pivoted disk by the rotating magnet and the currents are inversely proportional to the electrical resistance of the disk, the variations in temperature must seriously affect the speedometer readings. It is a fact that the magnetism of the rotating magnet decreases as the temperature increases from normal, that is, 70° F. and increases as the temperature decreases below normal, and as the torque on the disk depends upon the square of the magnetic field intensity, the variation in the strength of the magnet means double the variation in the speedometer reading. Heretofore, attempts have been made in various ways to overcome these inaccuracies, but thus far the means employed have been too expensive and delicate to be practical and have been uncertain and inaccurate in their results.

The object of my invention is to provide a simple, inexpensive and reliable means for compensating for changes of temperature by changing the relative location of the rotating magnet and pivoted disk, and the relative location of the magnet and the field member.

To these ends, my invention consists in the novel features of construction and in the combination and arrangement of parts set forth in the following specification and particularly pointed out in the claims.

Figure 2:
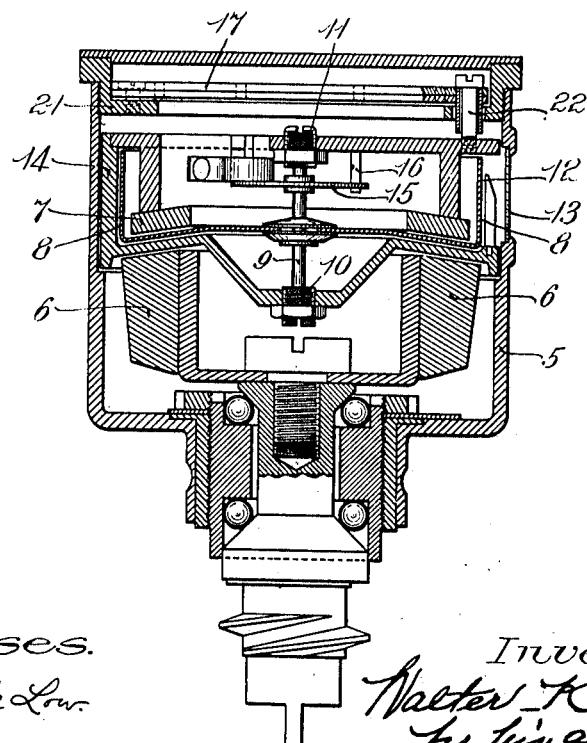

Referring to the drawings: Figure 1 is a plan of an electro-magnetic indicating instrument embodying my invention, the cover being removed. Fig. 2 is a sectional view taken on line 2—2 of Fig. 1.

Like numerals refer to like parts throughout the several views of the drawings.

In the drawings, referring to Figs. 1 and 2, wherein I have shown an electro-magnetic speedometer of the "Warner" type, 5 is the casing, 6 the magnetic rotor, 7 the field ring, and 8 is the aluminum disk interposed between the magnetic rotor and the field member and affixed to a shaft 9 pivoted in bearings 10 and 11 so as to swing freely on the same axis on which the rotor 6 rotates. This disk which carries the indicating element is provided with a vertical flange 12 which, in practice is provided with suitable numerals on its periphery, not shown, which numerals are viewed through a glass window 13.

The bearings 10 and 11 and the field ring 7 are mounted in a casing 14 which is of non-ferrous material. When the rotor 6 is rotated, it generates eddy currents in the metal disk 8, the reaction of these currents on the magnetic field of the rotor supplying a torque to the disk so that the magnetic pull thereon tends to rotate the disk with the rotor. The disk, however, is restrained by a suitable yielding means consisting of a hair spring 15 secured at its inner coil to the shaft 9 and at its outer end to a suitable fixed pin 16. This spring acts to keep the indicator steady at all speeds and return it to zero when the magnetic force stops.

The field ring 7 serves to concentrate and conserve the magnetism, thereby insuring a more powerful pull on the pivoted disk 8. Thus far, the construction and operation are well known to those skilled in the art.

I will now proceed to describe the means whereby I am enabled to compensate for changes of temperature whereby the inaccuracies of the instrument owing to variations of temperature are obviated. The casing 14 which contains the field ring 7 and the pivoted disk 8 is supported by one or more laminated thermostats, preferably two as shown, which are designated by the numerals 17 and 18, each of these thermostats being preferably composed of two laminæ, the upper lamina of each thermostat being formed of a material having a greater co-efficiency of expansion than the lower lamina. In practice, the best results have been secured with zinc for the upper lamina and steel for the lower lamina, the two strips of metal being riveted together by suitable rivets 19 and 20.

The thermostat 17 is supported at its left hand end upon a fixed ring 21 forming a part of the casing 5 and the right hand end of the thermostat 18 is supported upon said ring. The right hand end of the thermostat 17 and the left hand end of the thermostat 18 are unsupported, and from these unsupported ends the casing 14 is suspended by suitable means such, for example, as screws 22 and 23 supported, respectively, by the free ends of the thermostats 17 and 18 and screwed into the casing 14. In this way, the casing being supported at both sides will move in a direction parallel to the vertical axis thereof.

The laminæ of the thermostats 17 and 18 are so proportioned that at a normal temperature, say 70° F., at which the instrument is graduated, the thermostats are straight and the readings of the instrument are made correct for all speeds, and when the temperature varies above and below normal, the thermostats rise or fall, as the case may be, at their free ends, thus raising and lowering the casing 14 together with the ring 7 and disk 8, it being understood that when the temperature goes below normal the casing is raised and when the temperature goes above normal the casing is lowered.

Since the magnetism of the rotating magnet decreases as the temperature increases and increases as the temperature decreases, it will be seen that by properly proportioning the thermostats 17 and 18 these changes of temperature can be compensated for by imparting to the disk 8 and the ring 7 a motion relative to the rotating magnet 6, thus varying the gap between the rotating magnet and the disk 8 and ring 7. Consequently, although the field of the rotating magnet varies in intensity according to changes of temperature, the torque upon the pivoted disk 8 is made uniform by the employment of the laminated thermostats and the readings of the instrument are made substantially correct for all speeds.

Having thus described my invention, what I claim and desire by Letters Patent to secure is:

1. An electro-magnetic instrument having, in combination, means for creating a rotating magnetic field including a magnet and a magnetic mass, a member arranged within the influence of said field to be rotated thereby, means for yieldingly opposing said rotation, and thermostatic means for automatically moving said magnetic mass and said member toward and away from said magnet to compensate for changes in temperature.

2. An electro-magnetic instrument having, in combination, means for creating a rotating magnetic field including a magnet and a magnetic mass, a member arranged within the influence of said field to be rotated thereby, means for yieldingly opposing said rotation, and means for supporting said magnetic mass and said member including a thermostatic device whereby the relation of said magnetic mass and said member with respect to said magnet is automatically varied according to variations in atmospheric temperature, to vary the lines of force effective to rotate said member.

3. An electro-magnetic instrument having, in combination, means for creating a rotating magnetic field including a magnet and a magnetic mass, a member arranged within the influence of said field to be rotated thereby, a spindle on which said member is supported, means for yieldingly opposing the rotation of said spindle, a casing in which said magnetic mass is supported and in which said spindle is pivoted, and thermostatic means for supporting said casing whereby the relation of said casing, said magnetic mass and said member with respect to said magnet is automatically varied according to variations in atmospheric temperature, to vary the lines of force effective to rotate said member.

4. An electro-magnetic instrument having, in combination, means for creating a rotating magnetic field including a magnet and a magnetic mass, a member arranged within the influence of said field to be rotated thereby, a spindle on which said member is supported, means for yieldingly opposing the rotation of said spindle, an inner casing in which said magnetic mass is supported and in which said spindle is pivoted, an outer casing inclosing said inner casing and said magnet, and thermostatic means for supporting said inner casing within said outer casing whereby the relation of said inner casing, said magnetic mass and said member with respect to said outer casing and said magnet is automatically varied according to variations in atmospheric temperature to vary the number of lines of force effective to rotate said member.

5. An electro-magnetic instrument having, in combination, means for creating a rotating magnetic field including a magnet and a magnetic mass, a member arranged within the influence of said field to be rotated thereby, a spindle on which said member is supported, means for yieldingly opposing the rotation of said spindle, an inner casing in which said magnetic mass is supported and in which said spindle is pivoted, an outer casing inclosing said inner casing and said magnet, and a plurality of thermostatic devices for supporting said inner casing at a plurality of points within said outer casing whereby the relation of said inner casing, said magnetic mass and said member with respect to said outer casing and said magnet is automatically varied according to variations in atmospheric temperature to vary the number of lines of force effective to rotate said member.

6. An electro-magnetic instrument having, in combination, means for creating a rotating magnetic field including a magnet and a magnetic mass, a member arranged within the influence of said field to be rotated thereby, a spindle on which said member is supported, means for yieldingly opposing the rotation of said spindle, an inner casing in which said magnetic mass is supported and in which said spindle is pivoted, an outer casing inclosing said inner casing and said magnet, and a pair of thermostats each composed of metal strips having different heat coefficients, said thermostats being secured to said outer casing at opposite sides thereof and having their free ends extending in opposite directions, and means to secure the free ends of said thermostats to said inner casing at opposite sides thereof, whereby the relation of said inner casing, said magnetic mass and said member with respect to said outer casing and said magnet is automatically varied according to variations in atmospheric temperature to vary the number of lines of force effective to rotate said member.

7. An electro-magnetic instrument having, in combination, a field member and a coöperating rotatable magnet for producing a magnetic field, a metal disk rotatably mounted in said field, and means including a laminated thermostat forming an operative connection between said magnet and said field member and disk for automatically changing the relative location of said field member and disk to said magnet to compensate for changes of temperature.

8. An electro-magnetic instrument having, in combination, a rotatable magnet, a field member, a rotatable disk interposed between said magnet and said field member, a casing in which said disk is pivotally supported and in which said field member is supported, and means including a laminated thermostat forming an operative connection between said casing and said magnet for automatically changing the relative location of said magnet and said casing to compensate for changes in temperature.

In testimony whereof I have hereunto set my hand in presence of two subscribing witnesses.

WALTER K. MENNS.

Witnesses:
 WALTER E. McGRAW,
 LOUIS A. JONES.